United States Patent [19]

Brady et al.

[11] Patent Number: 5,554,974
[45] Date of Patent: Sep. 10, 1996

[54] ENCODABLE TAG WITH RADIO FREQUENCY READOUT

[75] Inventors: Michael J. Brady, Brewster; Praveen Chaudhari, Briarcliff Manor; Richard J. Gambino, Stony Brook; Harley K. Heinrich, Brewster; Paul A. Moskowitz, Yorktown; Robert J. von Gutfeld, New York, all of N.Y.

[73] Assignee: International Business Machines Corporation, Armonk, N.Y.

[21] Appl. No.: 344,808

[22] Filed: Nov. 23, 1994

[51] Int. Cl.$^6$ .................................................. G08B 13/14
[52] U.S. Cl. ......................... 340/572; 340/551; 324/300; 324/308; 428/611; 428/615
[58] Field of Search .................... 340/572, 551, 340/571; 324/300, 308; 128/653.1, 653.2, 653.4; 428/611, 615; 156/278, 279

[56] References Cited

U.S. PATENT DOCUMENTS

| | | | |
|---|---|---|---|
| 4,686,154 | 8/1987 | Mejia | 340/572 |
| 4,882,569 | 11/1989 | Dey | 340/572 |
| 4,940,966 | 7/1990 | Pettigrew et al. | 340/572 |
| 5,001,458 | 3/1991 | Tyrén et al. | 340/572 |
| 5,149,946 | 9/1992 | Jerome et al. | 324/300 |
| 5,175,499 | 12/1992 | Davies | 324/300 |
| 5,304,982 | 4/1994 | Cordery | 340/572 |
| 5,313,193 | 5/1994 | Dubois et al. | 340/572 |
| 5,401,584 | 3/1995 | Minasy et al. | 340/572 |

OTHER PUBLICATIONS

Duret et al.; "An Absolute Earth Field ESR Vectorial Magnetometer"; IEEE Transactions on Magnetics, vol. 28, No. 5, Sep. 1992; pp. 2187–2189.

Duret et al.; "Use of High Performance Electron Spin Resonance Materials for the Design of Scalar and Vectorial Magnetometers"; IEEE Transactions on Magnetics, MAG–27, 1992, pp. ? (3 pages total).

*Primary Examiner*—Jeffery Hofsass
*Assistant Examiner*—Benjamin C. Lee
*Attorney, Agent, or Firm*—Whitham, Curtis, Whitham & McGinn; Stephen S. Strunck, Esq.

[57] ABSTRACT

A programmable tag for being readable remotely and in a manner which does not require that the tag be held in a particular orientation, includes a first layer of material with electron spin resonance absorption, a second layer of hard magnetic material, and a third layer of soft permeable magnetic material. The second layer and third layer are in close proximity to the first layer. The second layer and the third layer impose a magnetic bias field on the first layer.

23 Claims, 3 Drawing Sheets

ENCODABLE TAG WITH RADIO FREQUENCY READOUT

BACKGROUND OF THE INVENTION

1. Field of the Invention

The present invention generally relates to a tag (e.g., marker, identifier, etc.) for attachment to an article of interest, and more particularly to a programmable tag which is remotely readable and which does not require that the tag be held in a predetermined orientation to be readable.

2. Cross Reference To Related Applications

The invention disclosed and claimed herein is related to the inventions disclosed and claimed in co-pending, co-assigned applications Ser. Nos. 08/344,805, 08/344,296, 08/344,771 and 08/344,196.

DESCRIPTION OF THE RELATED ART

For retail tagging, tagging used in the road/air-freight package industry, and pallet tagging in manufacturing processes, a tag (also known as an "identification tag" or "marker") is useful for identifying a product or article in detail. By providing the tag with a sufficient number of bits and interrogating the tag, the tag can provide information regarding what the product is, when it was manufactured, its price, whether the product has been properly passed through a check-out counter or kiosk, etc. Tags can also be used to identify a variety of other animate (e.g., personnel) and inanimate objects too numerous to mention.

Thus, tags are useful in retailing, shipping, manufacturing and many other kinds of businesses. As a practical matter, the cost of the tag should be a small fraction of the cost of the item being tagged. To be able to identify a large number of different objects, the tag should be capable of carrying approximately 64 bits. Further, to automate the tag reading process, the tag should preferably be remotely readable, and the readout signal should not be sensitive to the orientation of the tag. For purposes of this application, "remotely readable" means that the tag can be readable at a predetermined distance from the tag itself.

Markers or tags formed of materials that generate nuclear magnetic resonance (NMR), electron spin resonance (ESR), ferro- and ferri-magnetic resonance are known. In one conventional system, all forms of resonances are covered using a magnetic field in conjunction with a microwave interrogation field and microwave receiver. Generally, a single frequency is used, thereby allowing the tag to provide a single bit of data. Magnetic strips may be positioned near regions of an active resonance material to allow for more than one bit on the tag, the magnetic strips serving as a bias. However, this structure does not have flexibility in providing means for obtaining a large number of bits.

The magnetic strips provide an inhomogeneous field. The resonance material can be positioned in different field regions but the field is not uniform so that each incremental portion of the resonance material experiences a slightly different magnetic field. Therefore, the resonance occurs over a range of external bias fields. This is known as inhomogeneous broadening of the resonance peak. While the intrinsic line width may be $2 \times 10^{-5}$ T, the inhomogeneous broadening may make the effective line width greater by a factor of 10 to 100.

SUMMARY OF THE INVENTION

It is therefore an object of the present invention to provide an encodable (programmable) tag with electron spin resonance absorption having a magnetic bias field to thereby provide flexibility in providing a large number of bits.

In a first aspect of the invention, a programmable, radio frequency tag is provided according to the present invention which includes a first layer of material having electron spin resonance (ESR) absorption characteristics, a second layer of square loop magnetic material, and a third layer of soft permeable magnetic material. The second and third layers are in close proximity to (e.g., in close contact with) the first layer, and impose a magnetic bias field on the first layer. A readout signal generated from the tag is insensitive to the tag orientation.

In a second aspect of the invention, a method of constructing an encodable tag structure is provided according to the present invention in which the method includes: dissolving 1,1 diphenyl-2-picrylhydrazyl hydrate (DPPH) in a polar solvent; coating a nonmagnetic substrate with dissolved DPPH; depositing a hard magnetic bias layer having square loop properties on the nonmagnetic substrate having the dissolved DPPH; depositing a nonmagnetic layer over the hard magnetic bias layer; and coating the nonmagnetic layer with a soft magnetic material to form the encodable tag structure.

With the present invention, an encodable (programmable) tag is provided with an electron spin resonance absorption characteristic having a magnetic bias field for providing flexibility in providing a large number of bits. The inventive tag is remotely readable and does not require that it be held in a predetermined orientation to be readable.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
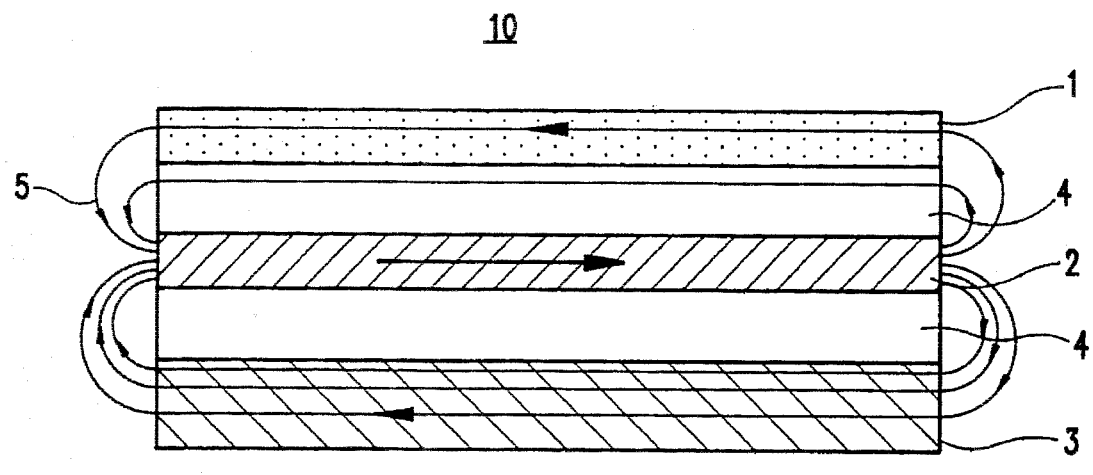
FIG. 1 is a cross-section of the tag structure of the present invention.

Referring now to the drawings, and more particularly to FIG. 1, there is shown a cross-section of the tag structure generally including a layer of resonant material (e.g., preferably electron spin resonance (ESR) material) 1, a layer of magnetic material 2 (e.g., preferably hard magnetic material), and a second layer of magnetic material 3 (e.g., preferably soft magnetic material). In this structure, layers 1 and 3 are immediately adjacent to layer 2.

Thermal barrier layers 4, preferably formed of amorphous Ge, or a polymeric material such as polyimide, polyethylene or polymethylmethacrylate (PMMA), or a polyester are placed between the ESR material 1 and the hard magnetic material 2 and between the hard magnetic material 2 and the soft magnetic material 3. Arrows 5 shown in FIG. 1 illustrate the direction of the magnetic field.

As illustrated in FIG. 1, the structure includes layers denoted as thermal barrier layers 4. These layers, as will be explained more fully below, are included to protect materials 1, 2 and 3 when the tags are personalized (coded) by thermal treatment means. Since layers 1, 2 and 3 may be arranged in any order (top to bottom) layer or layers 4 are also useful to break the magnetic exchange coupling when two layers of ferromagnetic material (e.g., materials 2 and 3) are stacked (layered) adjacent to one another. Layer 4 may also be comprised of a layer of oxide of one of materials 2 or 3.

Looking at the composition of the tag according to the invention in more detail, the inventive tag includes a magnetic bias structure and a resonant material, preferably an electron spin resonance (ESR) material. An example of the ESR material is 1,1 diphenyl-2-picrylhydrazyl hydrate commonly known as DPPH, a stable solid organic free radical. This material is widely used as a reference material in ESR spectral analysis.

The magnetic bias structure includes a thin film of a hard magnetic material (preferably having a coercivity greater than 200 Oe), such as Co-Pt-Ta, Fe-Zr-RE (where RE is a non-s-state rare earth element such as Tb, Dy, Ho or Er), or hexagonal cobalt, and a soft, permeable magnetic film, such as Ni-Co-B-Si or $Ni_{80}Fe_{20}$, used as a magnetic shunt or flux guide.

The bias magnet is magnetized and left in a remanent state for operation of the device. As shown in FIG. 1 by arrows 5, the magnetic field lines close on both sides of the hard magnetic layer through the ESR material as well as through the soft magnetic shunt.

The tag is read by monitoring the radio frequency (RF) absorption as a function of the magnetic field. The RF frequency has a fixed value, $f$, (e.g., in a preferred embodiment, a frequency of 2–8 MHz. was employed although any RF frequency may be employed as is evident to one ordinarily skilled in the art within the purview of the present application). The resonance condition is given by the magnetic field condition $f=(2.8\times10^{10})B$, where B is the magnetic field in Tesla and $f$ is the frequency in Hertz.

The magnetic field B which determines the resonance is the sum of the applied field ($B_A$) and the bias field ($B_B$).

Information is encoded (e.g., programmed) on the tag by providing a series of different bias fields on patches of DPPH (e.g., the ESR material 1). As the applied field (e.g., the magnetic DC field) is swept in magnitude as a function of time, the individual patches resonantly absorb at different applied fields. The resonant line width of DPPH and similar materials is very narrow, typically less than $2 \times 10^{-5}T$, and thus detection of the information encoded on the tag is highly reliable.

The RF coil can be used for both excitation and detection with a suitably designed bridge circuit as known in the art and as believed to be well within the grasp of the ordinarily skilled artisan within the purview of the present application. A combined excitation and detection coil has been used in ESR magnetometers operating at 30MHz used to measure the earth's magnetic field.

Figure 2A:
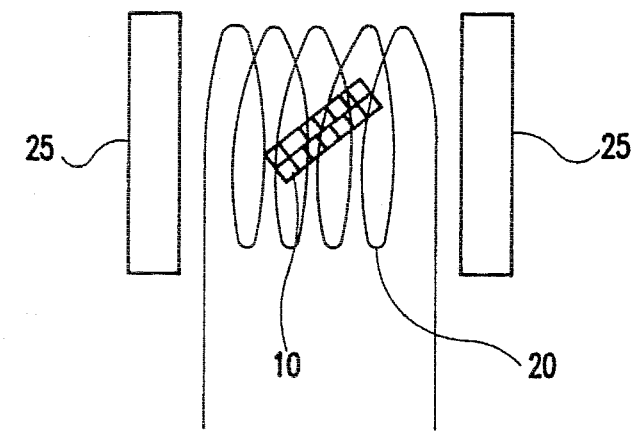
FIG. 2a illustrates a tag positioned between Helmholtz coils and a radio frequency coil.
Figure 2B:
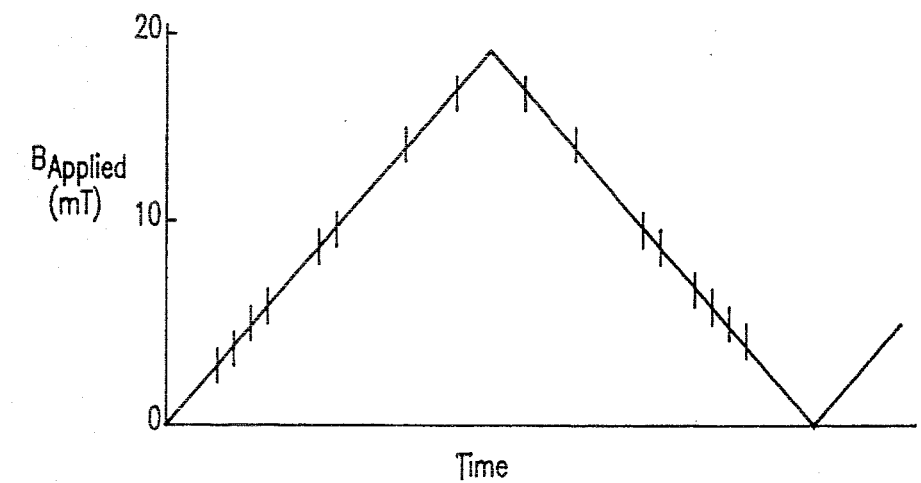
FIG. 2b is a graph illustrating the applied field over time.
Figure 2C:
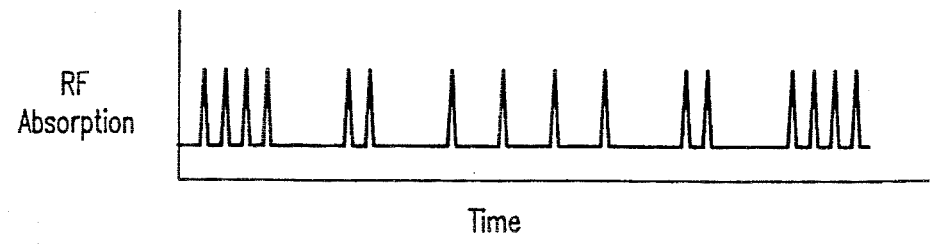
FIG. 2c is a graph illustrating RF absorption over time.

FIG. 2A illustrates a system for reading the DPPH patches of material 1 in which the tag reader is provided with an RF coil 20 for excitation and detection of the absorption and a Helmholtz pair of coils 25 for applying the magnetic field to tag 10. The magnetic field is swept in time, as shown in FIG. 2B, and the absorption monitored as a function of time, as shown in FIG. 2C. The data stream and its mirror image are obtained with the upward and downward sweeps of the applied field.

A key feature of the present invention is the alterable magnetic shunt which allows the bias field to be personalized at individual patches of the ESR resonator.

Referring again to FIG. 1 which illustrates the individual ESR resonator patch with its bias magnet and shunting magnet, the bias field on the ESR resonator will be highest where the permeable shunt layer is absent. As the thickness of the shunt layer is increased, more field is shunted in that direction and the bias field on the ESR resonator is decreased.

If the shunt layer has a fixed, predetermined thickness, its permeability can be selectively modified by introducing non-magnetic breaks therein. The non-magnetic regions can be created by laser ablation or by a thermally initiated reaction, such as an oxidation reaction, as known in the art. In either case, the pattern of non-magnetic regions can be created under computer control to determine the desired data pattern.

Another feature of the invention is that the tag according to the invention need not be held in a predetermined orientation to be readable. This feature is provided by using reference bits which provide a relative field separation.

Looking at the materials and an exemplatory method used for the inventive tag structure in greater detail, DPPH (preferably used for material 1) is a solid which melts at 150° C. and is soluble in polar solvents and lends itself to incorporation in a polymer matrix. The polymer blend may be loaded with 10 to 20% DPPH and preferably 15% DPPH.

The polymer DPPH mixture in a suitable solvent can be continuously coated at a preferred thickness range of 2 μm onto a sheet of material preferably having a thickness of a few mils and which serves as a substrate and a thermal barrier (e.g., material 4) between the ESR active material 1 and the magnetic bias layer 2.

After evaporating the solvent, the substrate sheet can be coated by physical vapor deposition (PVD) methods. First, a (hard) magnetic bias layer is deposited, which preferably has good square loop properties, i.e. remanence of over 80% and a coercivity greater than 200 Oe.

Compositions such as Co-Pt-Ta used in the art as thin film magnetic recording media are preferably used. Another composition preferably used is Fe-Zr-RE (where RE stands for one of the non-s-state rare earth elements such as Tb, Dy, Ho, or Er). These elements tend to induce a large magnetocrystalline anisotropy which enhances the square loop properties of the magnetic bias layer.

After the deposition of the magnetically hard bias layer 2, a thermal barrier 4 (e.g., a nonmagnetic layer) is deposited. A suitable material for the thermal barrier is amorphous Ge about 5000 Å thick prepared by sputtering. Other materials which are suitable for use include those previously described and $Al_2O_3$, amorphous silicon and the like.

Lastly, layer 4 is coated with a magnetically soft material such as Ni-Co-B-Si or Co-Zr, at a preferred thickness of 5000 Å. Other magnetically soft materials which can be used include $Ni_{80}Fe_{20}$, permalloy or the like. These compositions are selected because they have low magnetostriction and low magnetic anisotropy and therefore have a high permeability. Alternatively, layer 4 may be formed of a plurality of alternating layers of the soft alloy and layers of Ge (e.g., preferably three times). The advantage of this structure is that it provides a means of altering the effective bias field by laser or other heating (e.g. joule heating) to interdiffuse the Ge and soft magnetic material to decrease the permeability of the soft magnetic material. The process of forming such a structure by heating is disclosed in co-pending, co-assigned U.S. patent application Ser. No. 07/877,937, filed on May 1, which is incorporated herein by reference.

Each tag may then be personalized to form a distinct identification code of one's choice by writing a pattern of nonmagnetic regions in the permeable layer 3 to change its reluctance. If the soft magnetic layer 3 consisted of layers of Ge and soft magnetic material, this may be accomplished by heating to about 200° C. for about 100μsec to react the Ge with the soft magnetic alloy in selected regions. This operation is preferably performed by a laser (such as a $CO_2$, He-Ne, or excimer laser) or some other suitable heat source. The tag may be personalized by removing selected regions of layer 3 as by laser ablation as is depicted by the horizontal lines in FIG. 3.

Figure 3:
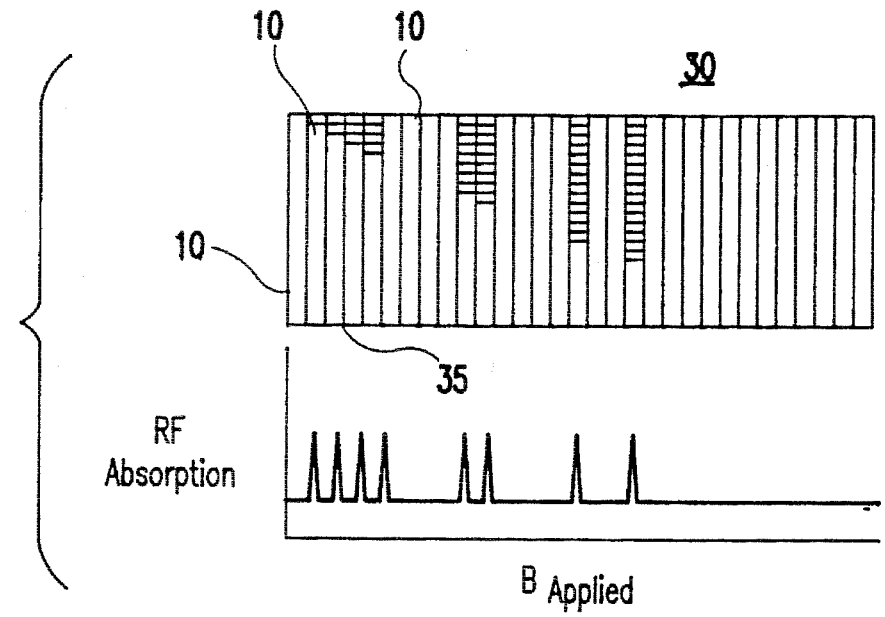
FIG. 3 illustrates an exemplary pattern of laser written gaps in a magnetic shunt layer.

A multibit tag may also be made as shown in FIG. 3. In this embodiment, an array of tags 10 stacked side by side is shown. The individual tags 10 of such an array may then be personalized (programmed), as previously described to form the multibit tag. Alternatively, the individual tags 10 may be coded before stacking. The tags, with proper consideration given to magnetic shielding between tags 10, can also be vertically stacked (i.e., one on top of the other) to form the multibit tag. Yet further, a large rectangular tag 30 may be selectively coded in the smaller rectangular tag regions 10 shown in FIG. 3. The separations or boundaries 35 may result from the physical side by side stacking of individual tags 10 as previously described, by physically scribing through soft magnetic layer 3 as with a diamond stylus, by laser ablation or scribing, or by selective heat treatment. Further yet, large rectangular tag 30 may have individually programmed tag regions wherein regions 35 are regions of unaltered material 3.

The ratio of reluctance of a magnetic shunt with a gap to the reluctance of a shunt without a gap is given by:

$$re.gap/rel.withoutgap = 1 + (l_g/l)(\mu - 1)$$

where $\mu$ is the permeability of the shunt material, $l$ is the length of the magnetic shunt, and $l_g$ is the total length of the gaps in the magnetic circuit. For example, if a laser is used to introduce gaps of constant length, then the reluctance will depend linearly on the number of gaps and thus the bias field on the DPPH layer 1 will depend linearly on the number of gaps.

Figure 4:
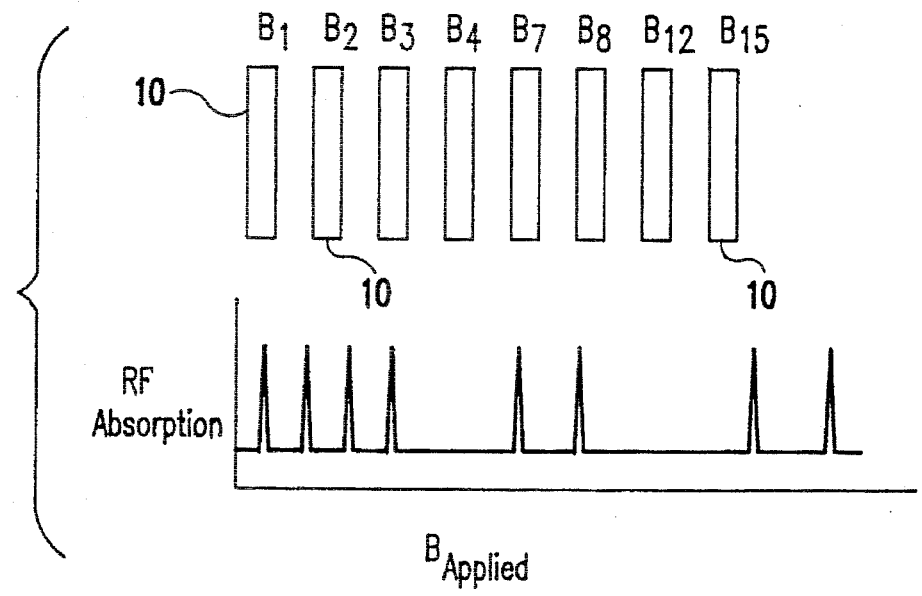
FIG. 4 illustrates a mechanical assembly of strips with different bias fields.

Another means of making a multibit tag is to make a series of single tags 10 having different bias fields and then arrange such tags as shown in FIG. 4. Such different bias fields may be provided, for example, by making tags with shunt layers of different thicknesses or hard layers of different magnetization or thicknesses. After testing for their resonance field, each coating run is classified according to the bias field on the ESR material 1. Thereafter, the tag is assembled mechanically by selecting patches with the desired set of bias fields. Tags 10 can be coated with a self-sticking adhesive, such as rubber cement or the like, for easy assembly. FIG. 4 illustrates an example of an assembled tag having the RF absorption characteristics over the magnetic field applied. Vertical stacks are also possible so long as nonmagnetic layers are provided between magnetic layers of adjacent tags.

With the invention, a programmable tag (e.g., marker, identifier, etc.) is provided which is remotely readable and which does not require that the tag be held in a predetermined orientation to be readable. Further, the encodable (programmable) tag has an electron spin resonance absorption characteristic having a magnetic bias field for providing flexibility in providing a large number of bits.

The absorption of radio frequency (RF) energy by the individual tag elements at resonance can be readily detected by several devices (e.g., a voltage detector, etc.), for example, accompanying voltage changes in portions of the RF excitation coil circuit (not shown in detail in FIG. 2A). These voltage changes are commonly used to plot the resonance curves as a function of applied magnetic field. These same voltages, occurring at different field strengths at the tag resonances, can be interfaced to a computer (or similar processing element) having a memory incorporating lookup tables or the like, to correlate field strength with resonance for identification of the item to which the tag is attached. Such interfacing is well known to those skilled in the art. By suitable programming, the distinct code can be digital in nature, i.e., the presence or absence of RF energy absorption at a given applied magnetic field strength can correspond to a "1" or a "0".

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A programmable tag, comprising:

a first layer of magnetic material, a second layer of magnetic material, and a layer of resonant material, said resonant material having an electron spin resonance absorption characteristic, wherein one of said first layer and said second layer comprises a hard magnetic material and the other of said first layer and said second layer comprises a soft magnetic material, said first layer and said second layer being in close proximity to said layer of resonant material, and said first layer and said second layer imposing a magnetic bias field on said layer of resonant material, said magnetic bias field being selectively altered to thereby program said tag, wherein said soft magnetic layer provides an alterable magnetic shunt for personalizing said bias field applied thereto at individual portions of said layer of resonant material.

2. A programmable tag according to claim 1, wherein said layer of resonant material includes 1,1 diphenyl-2-picrylhydrazyl hydrate.

3. A programmable tag according to claim 1, wherein said hard magnetic layer comprises one of Co-Pt-Ta and Fe-Zr-RE, where RE is a non-s-state rare earth element including one of Tb, Dy, Ho and Er.

4. A programmable tag according to claim 1, wherein said soft magnetic layer comprises one of an alloy of Ni-Co-B-Si and Co-Zr.

5. A programmable tag according to claim 1, wherein said magnetic bias field imposed on said layer of resonant material is substantially uniform within the volume of said layer of resonant material and the strength of said magnetic bias field is selectively altered, thereby to program said tag.

6. A programmable tag according to claim 1, wherein portions of said layer of resonant material have different magnetic bias fields.

7. A programmable tag, comprising:

a first layer of magnetic material, a second layer of magnetic material, a layer of resonant material, said resonant material having an electron spin resonance absorption characteristic, wherein one of said first layer and said second layer comprises a hard magnetic material and the other of said first layer and said second layer comprises a soft magnetic material, said first layer and said second layer being in close proximity to said layer of resonant material, and said first layer and said second layer imposing a magnetic bias field on said layer of resonant material, said magnetic bias field being selectively altered to thereby program said tag, and further comprising a thermal barrier layer formed between said layer of soft magnetic material and the immediately adjacent layer or layers.

wherein said soft magnetic layer provides an alterable magnetic shunt for personalizing said bias field applied thereto at individual portions of said layer of resonant material.

8. A programmable multibit tag comprising a plurality of claim 1, 6 or 7 tags wherein each of said tags has a selected bias field.

9. A method of reading an encoded tag, said encoded tag comprising one or more claim 1, 6, or 7 tags, said method comprising the steps of:

providing a radio frequency (RF) field around said encoded tag; and measuring an absorption of said RF field while simultaneously exposing said encoded tag to a time varying magnetic field.

10. A personalized multibit tag comprising a plurality of claim 1, 6 or 7 tags, wherein each of said tags is vertically stacked and each tag has a distinct code.

11. A programmable tag according to claim 7, wherein said thermal barrier layer is formed of one of Ge, a polymeric material, a polyester, $Al_2O_3$ or amorphous silicon.

12. A programmable multibit tag comprising the tag of claim 1, 6 or 7 wherein said programmable multibit tag is subdivided into two or more regions having a boundary between regions, wherein altered regions are substantially non-magnetic and the unaltered regions are magnetic, and each region has a selected bias field.

13. The tag of claim 12 wherein said boundary comprises unaltered material of said tag.

14. The tag of claim 12 wherein said boundary comprises altered material of said tag.

15. The tag of claim 12 wherein said boundary is formed by the side by side stacking of individual said claims 1, 6 or 7 tags and said boundary comprises the edges of adjacent said individual tags.

16. A system for reading a programmable tag, said programmable tag including one or more claim 1, 6, or 7 tags, said system comprising:

means for providing a radio frequency (RF) field around said programmable tag;

means for providing a time varying magnetic field; and means for measuring an absorption of said RF field around said programmable tag while simultaneously exposing said programmable tag to said time varying magnetic field.

17. A system according to claim 16, further comprising an electronic device for receiving an output from said means for measuring and for decoding said output in terms of voltage changes as a function of said time varying magnetic field to establish a code for comparison with a predetermined code, wherein said means for providing said time varying magnetic field includes at least one of a coil carrying an alternating current (AC) and a direct current magnet.

18. A programmable tag, comprising:

a first layer of magnetic material, a second layer of magnetic material, and a layer of resonant material, said resonant material having an electron spin resonance absorption characteristic, wherein one of said first layer and said second layer comprises a hard magnetic material and the other of said first layer and said second layer comprises a soft magnetic material, said first layer and said second layer being in close proximity to said layer of resonant material, and said first layer and said second layer imposing a magnetic bias field on said layer of resonant material, said magnetic bias field being selectively altered to thereby program said tag, wherein said soft magnetic layer provides an alterable magnetic shunt for selectively shunting a portion of said magnetic bias field to achieve personalization of said bias field applied thereto at individual portions of said layer of resonant material.

19. A programmable tag, comprising:

a first layer of magnetic material, a second layer of magnetic material, and a layer of resonant material, said resonant material having an electron spin resonance absorption characteristic, wherein one of said first layer and said second layer comprises a hard magnetic material and the other of said first layer and said second layer comprises a soft magnetic material, said first layer and said second layer being in close proximity to said layer of resonant material, and said first layer and said second layer imposing a magnetic bias field on said layer of resonant material, said magnetic bias field being selectively altered to thereby program said tag, wherein said soft magnetic layer has a fixed, predetermined thickness, and a plurality of non-magnetic breaks therein for selectively modifying the permeability of said soft magnetic layer, said non-magnetic breaks selectively increasing the flux carrying capacity of said soft magnetic layer.

20. A method of constructing an encodable tag, said method comprising steps of:

dissolving 1,1 diphenyl-2-picrylhydrazyl hydrate (DPPH) in a solvent;

coating a nonmagnetic substrate on a first side with dissolved DPPH;

depositing a hard magnetic bias layer having square loop properties on a second side of said nonmagnetic substrate having said dissolved DPPH;

depositing a nonmagnetic layer over said hard magnetic bias layer; and coating said nonmagnetic layer with a soft magnetic material to form said encodable tag.

21. A method as in claim 20, wherein said hard magnetic layer is selected from a group consisting of Co-Pt-Ta and Fe-Zr-RE, where RE comprises a non-s-state rare earth element.

22. A method as in claim 20, wherein said soft magnetic material is selected from a group consisting of Ni-Co-B-Si and Co-Zr.

23. A method according to claim 20, wherein said nonmagnetic substrate comprises at least one of Ge, a polymeric material, a polyester, $Al_2O_3$ or amorphous silicon.

* * * * *